United States Patent
Alcorn

(12) 
(10) Patent No.: US 6,553,723 B1
(45) Date of Patent: Apr. 29, 2003

(54) RAINWATER COLLECTION AND STORAGE SYSTEM

(76) Inventor: Gary Alcorn, 1 Dorge Street, M/S 1082, Toowoomba Qld 4350 (AU)

( * ) Notice: Subject to any disclaimer, the term of this patent is extended or adjusted under 35 U.S.C. 154(b) by 0 days.

(21) Appl. No.: 09/671,448

(22) Filed: Sep. 27, 2000

(65) Prior Publication Data (65)

(30) Foreign Application Priority Data

Sep. 29, 1999 (AU) ............................................. PQ3149

(51) Int. Cl.⁷ ............................................... E04D 13/04
(52) U.S. Cl. ........................ 52/15; 52/12; 52/61; 52/62
(58) Field of Search ................................ 52/11–16, 50, 52/61, 62

(56) References Cited

U.S. PATENT DOCUMENTS

| 5,220,755 | A | * | 6/1993 | Roles | ........................... | 239/208 |
| 5,333,417 | A | * | 8/1994 | Demartini | ..................... | 52/11 |
| 6,009,672 | A | * | 1/2000 | Kuhns | ........................... | 52/13 |
| 6,253,495 | B1 | * | 7/2001 | Weber | ........................... | 52/11 |
| 6,256,933 | B1 | * | 7/2001 | Kuhns | ........................... | 52/13 |
| 6,357,183 | B1 | * | 3/2002 | Smith | ........................... | 52/15 |

FOREIGN PATENT DOCUMENTS

| AU | 53008 | * | 7/1994 | ............. E03B/3/30 |
| AU | 53008/94 | A | 7/1994 | |
| AU | 40089/93 | A | 12/1994 | |
| DE | 2933280 | A | 3/1981 | |
| DE | 3218190 | A | 11/1983 | |
| DE | 3427205 | A | 3/1985 | |
| DE | 3537163 | A | 8/1986 | |
| DE | 19751590 | C1 | 4/1999 | |
| DE | 19800030 | A1 | 7/1999 | |
| FR | 2470209 | A | 6/1981 | |
| GB | 3419529 | | * 11/1985 | ............. E03D/1/00 |
| GB | 3825310 | | * 2/1990 | ........... E04D/13/04 |
| GB | 2291924 | A | 2/1996 | |
| JP | 09242129 | | * 3/1996 | ............. E03B/3/30 |
| JP | 09078638 | | * 3/1997 | ............. E03B/3/03 |
| JP | 09111813 | A | 4/1997 | |
| JP | 09111817 | A | 4/1997 | |
| JP | 10317538 | A | 12/1998 | |
| JP | 11229447 | A | 8/1999 | |
| WO | WO98/22665 | | * 3/1998 | ............. E03B/3/02 |

* cited by examiner

*Primary Examiner*—Carl D. Friedman
*Assistant Examiner*—Yvonne M. Horton
(74) *Attorney, Agent, or Firm*—Hoffman, Wasson & Gitler

(57) ABSTRACT

A rainwater collection and storage system to collect and store roof water, the system comprising water collection slots extending through roof sheets and spaced from the edge of the roof, collection means below the roof sheets to collect the water from at least some of the slots, and at least one tank wall to store the collected water, the at least one tank wall having a narrow section to approximate a wall thickness, and typically extending from a ground floor to adjacent the roof.

17 Claims, 3 Drawing Sheets

RAINWATER COLLECTION AND STORAGE SYSTEM

TECHNICAL FIELD

This invention relates generally to a rainwater collection and storage system, and more particularly to a gutterless rainwater harvesting and storage system which allows a controlled percentage of roof run-off to access, via designed slots in steel roof sheeting and a collection system, a series of narrow section (200 to 250 mm wide) tanks, which, in new building construction, can replace conventional solid external walls. The slots in the roof sheeting are dimensioned and shaped to allow optimum water entry, while excluding leaves and gum nuts.

BACKGROUND ART

Water tanks to store roof water are extremely well-known. It is well-known to provide a steel, or plastic, and a generally cylindrical, water tank next to a house with the gutters of the house being connected to the water tank inlet via a down pipe. It is known to have mesh screens or similar devices to keep leaves, twigs, and the like from entering the rainwater tank. These large cylindrical tanks are usually placed next to the house and on a support platform.

It is also known to have mini tanks (typically formed from plastic) positioned against a house wall and under the roof eaves. The mini tank can hold between 200 to 1000 litres of water and, as is common, has a lower tap. Again, a mesh screen and the like can be used to keep leaves and twigs from entering the mini tank. The mini tank is attached to the roof gutter via a down pipe.

One disadvantage with these existing tanks is that they collect water from the roof gutter. The roof gutter is usually clogged with leaves, twigs, dirt, dust and rotting material, and the sieves and screens are not able to remove anything other than the larger twigs and leaves. This means that water in the tank can still contain appreciable undesired residue. This can be alleviated by regular and thorough cleaning of the roof gutters, but this is a job which is not popular with most home owners, inter alia, for safety reasons.

In rural and bush environments, gutters can be a fire hazard through leaf build-up and it is not uncommon for houses in these areas to not have gutters and instead to allow water to fall straight off the edge of the roof. Another disadvantage with gutters is that leaf build-up in the gutters can cause flooding of the eaves through over topping. However, gutterless systems would prevent water from being collected for conventional cylindrical tanks or mini tanks.

Another disadvantage with conventional water tanks is that they are unsightly and are often in the way. While the mini tanks attempt to minimise this disadvantage, these tanks are still quite visible and noticeably bulge from a house wall.

Conventional water tanks are used only to collect and store water for drinking or irrigation purposes. To date, there has been no attempt to utilize the potential heat exchange properties of the water stored within the tank. If the tanks are placed in the sun, the water will slowly warm up, and in theory, can provide a good source of heat during the cooler periods at night. However, conventional tank designs do not take advantage of this property.

The present invention is directed to a rainwater collection and storage system which can collect and store rainwater without requiring the roof gutter. The invention is also directed to a climate management system for a building which uses a series of water tanks.

It is an object of the invention to provide a rainwater collection and storage system which may overcome the abovementioned disadvantages or provide the public with a useful or commercial choice.

SUMMARY OF THE INVENTION

In one form, the invention resides in a rainwater collection and storage system to collect and store roof water, the system comprising water collection slots extending through roof sheets and spaced from the edge of the roof, a manifold or other type of collection means below the roof sheets to collect the water from at least some of the slots, and at least one tank wall to store the collected water, the at least one tank wall having a narrow section to approximate a wall thickness, and typically extending from a ground floor to adjacent the roof.

In another form, the invention resides in a climate management system for a building which comprises a plurality of water tanks spaced about the building and either forming part of the external walls, or in front of the external walls, the water tanks being of narrow section to approximate a wall thickness, the tanks being interconnected by pipe work, pump means to pump water between the tanks, and temperature sensing means to sense the water temperature in the tanks, whereby water can be pumped between tanks to provide climate control to the building.

The rainwater collection and storage system collects water via slots extending through the roof sheeting and therefore does not require a gutter. This can provide cleaner and more hygienic water. The system can be used on roofs which are gutterless, for instance of houses in wooded areas where bush fires are a risk.

The roof sheets are typically metal profiled roof sheets as the collection slots are fairly easily punched or otherwise formed in the sheets. The collection slots are positioned to intercept the water running along at least some portion of the roof. It is envisaged that the slots can extend across the entire roof width, or along discrete portions or zones of the roof.

The collection slots are spaced from the edge of the roof. This may be in order to collect clean water, it being appreciated that at the edge of the roof there can be leaf, twig and other debris build-up. If the roof is supported by a wall, it is preferred that the slots are positioned to be substantially above the wall for reasons which will be described in greater detail below.

A number of collection slots may be provided and the size and shape of the collection slots can vary depending inter alia on the profile of the roof, and the typical annual rainfall in the region. The collection slots may be configured such that in heavy downpours, excess water simply bridges the slot gaps and runs off the edge of the roof. In low rainfall areas, more collection slots may be provided to catch as much water as possible. The shape and size of the slots is preferably such to allow optimum water entry while excluding leaves, twigs, gum nuts and the like.

In a preferred embodiment of the invention, the collection slots are located in roof insert members and the insert members may be mounted in receiver slots formed in the roof. Typically, the insert members are removably mounted in the receiver slots. An advantage of providing removable insert members is that the density, size and the like of the collection slots may easily be changed if desired by interchanging insert members having collection slots of different sizes etc. Insert members can also be replaced if damaged or irreversibly blocked by a twig or the like. This may be more cost effective than replacing a roof section. Insert members may also be interchanged to optimize rain water collection during dry or wet seasons. The profile (for instance corrugations) provides ridges and valleys with the valleys concentrating the water running off the roof sheets.

The roof insert member can be made from metal or ultra-violet stabilised plastics and comprises a shape consistent with the receiver slot in the roof sheeting surface. The insert member typically has first or upper end and a second or lower end, and in use the first end is located upstream from the second end relative to the normal direction of rainwater flow across the roof. Both ends of the roof insert members typically have a discrete shape so that they may be inserted in one direction only.

Typically, the upper end of the insert member contains a mouth-like slot which, in use, houses an edge of the roof sheeting receiver slot and positively locates the nose or upper end of the insert member. On the lower surface of the insert member at the lower or tail end of the insert member may be located a small tab depending therefrom. This tab typically includes a grippable portion to assist in manual removal of the insert member and may also act as a roofwater flow brake to assist flow capture by the insert member.

The lower surface of the insert member typically firmly or snuggly fits in the roof receiver slot. However, the insert members upper surface is typically dimensioned to be slightly larger than the receiver slot thus providing a substantially watertight fit and a support function around the margin of the insert member. Typically, the insert member has a lip extending along at least part of the upper surface and in use this lip overlaps the edge of the roofing sheet.

On the lower surface of the insert member at the bottom, or downstream, end is typically located a vertical deflector tab or fin which can direct any roofwater running on the lower side of the insert member down into the collection means. Part of this vertical defector fin may also contain an integral lever clip which positively locates the insert member in the receiver slot of the roof sheeting. Typically such a clip would be able to be compressed by thumb or finger pressure to enable the insert member to be unlocked, removed and replaced by another insert member suited to updated rainfall forecast trends.

By providing a number of interchangeable insert members containing varying numbers and patterns of collection slots, it is possible to provide suitable capacity to accept varying expected rainfall events determined by the geographical location and the seasonal characteristics of various localities. Such information is now provided by long range climate forecast units sponsored by government. Based on these climate forecasts, a house owner can easily replace the insert member with another set more suitably calibrated to the expected rainfall outlook.

Underneath the roofing sheets and below the collection slots is a collection means, typically in the form of a moulded box chamber. The box chamber which can be made from plastic collects the roofwater from at least some of the collection slots. If a width of roof is provided with an array of insert members, each box chamber located between the roof rafters may discharge into a manifold provided to collect the water passing through all the insert members and to pass the water into at least one tank wall.

The manifold can be in the form of a pipe underneath the box chambers to collect the water. A number of separate manifolds may be provided each collecting water from a zone or array of insert members and passing the water into the same or different tank wall modules.

The manifold may be connected to one or several box chambers which have a wider upper area immediately below the insert members and a lower narrower pipe area which connects with the manifold. A mesh or sieve can extend through the box chamber and between the insert members and the chamber neck to remove any debris which may pass through the insert member strainer surface.

On leaving the manifold and entering the tank wall unit, the initial contaminated roofwater containing dust and other organic matter typically flows into an integral and separate tank column located inside the tank wall module. Once this inner tank column is filled all other roof water flows into the main storage volume of the tank wall. The first flush water discharges through a dump valve at the base of the inner tank to waste.

Underneath the roofing sheets and below the collection slots is a collection means, typically in the form of a manifold. The manifold collects the water from at least some of the slots. If a width of roof is provided with an array of slots, a single manifold can be provided to collect the water passing is through all the slots and to pass the water into at least one tank wall. The manifold can be in the form of a gutter underneath the slots to collect the water. A number of separate manifolds may be provided each collecting water from a zone or array of slots and passing the water into the same or different tank walls.

The manifold may form the lower part of a collector box which has a wider upper area immediately below the water collection slots and a lower narrower gutter area which comprises the manifold. A mesh or sieve can extend through the collector box and between the slots and the manifold to remove any debris which may pass through the slots.

Between the manifold and the tank wall may be a first flush pipe valve which collects and disposes of the first quantity of water entering into the manifold, the first quantity often containing dust and debris. Once the initial contaminated water has been disposed of, the remaining water can enter into the inlet of the tank wall.

The tank wall is typically of a metal and/or plastic construction, and can replace conventional solid external walls. The section of the tank wall can be typical of an external wall which can be between 200 to 250 mm wide. The tank wall can extend from adjacent a ground floor to adjacent the roof. It is preferred that the tank wall is generally below the slots in the roof sheets. The tank wall can have a height of between 200 to 300 cm and a length which allows it to be positioned between load bearing posts or columns which support the roof structure. If the load bearing posts or columns are between 2 to 3 m apart, the tank wall can have a length of between 2 to 3 m to fit between the posts or columns.

The tank wall can be manufactured from steel such as coated corrugated steel with flat steel or moulded plastic ends, plastic such as food grade polyethylene, fibreglass or other materials.

The building can have an array of tank walls positioned between posts or columns and taking into account windows or doors. The tank walls can act as an efficient insulator against extremes of heat or cold, can provide a water supply for fire fighting, gardens, pools, or consumption.

If desired, the tank wall can be positioned below a window, and in this arrangement, the tank wall does not extend adjacent the roof but instead extends to below the bottom of the window. A suitable pipe can extend from the manifold to the tank wall.

The tank walls can provide a climate management system. For instance, the tank walls can be spaced about the walls of a house to absorb heat from a western wall in summer or a northern wall in winter (in the southern hemisphere). The tank walls can be interconnected by pipe work and a pump can be provided to pump water between the tanks. For instance, cooler water from the east side of the house can be pumped to a west facing tank to cool the west facing side of the house. In winter, warmer water can be distributed around the house from the north facing tank. A temperature sensing means can be provided to sense the water temperature in the tanks.

As well as providing a supply of water and climate control, the wall tanks also have good acoustic absorbing ability to reduce the noise levels from outside.

DESCRIPTION OF THE PREFERRED EMBODIMENT

Figure 2:
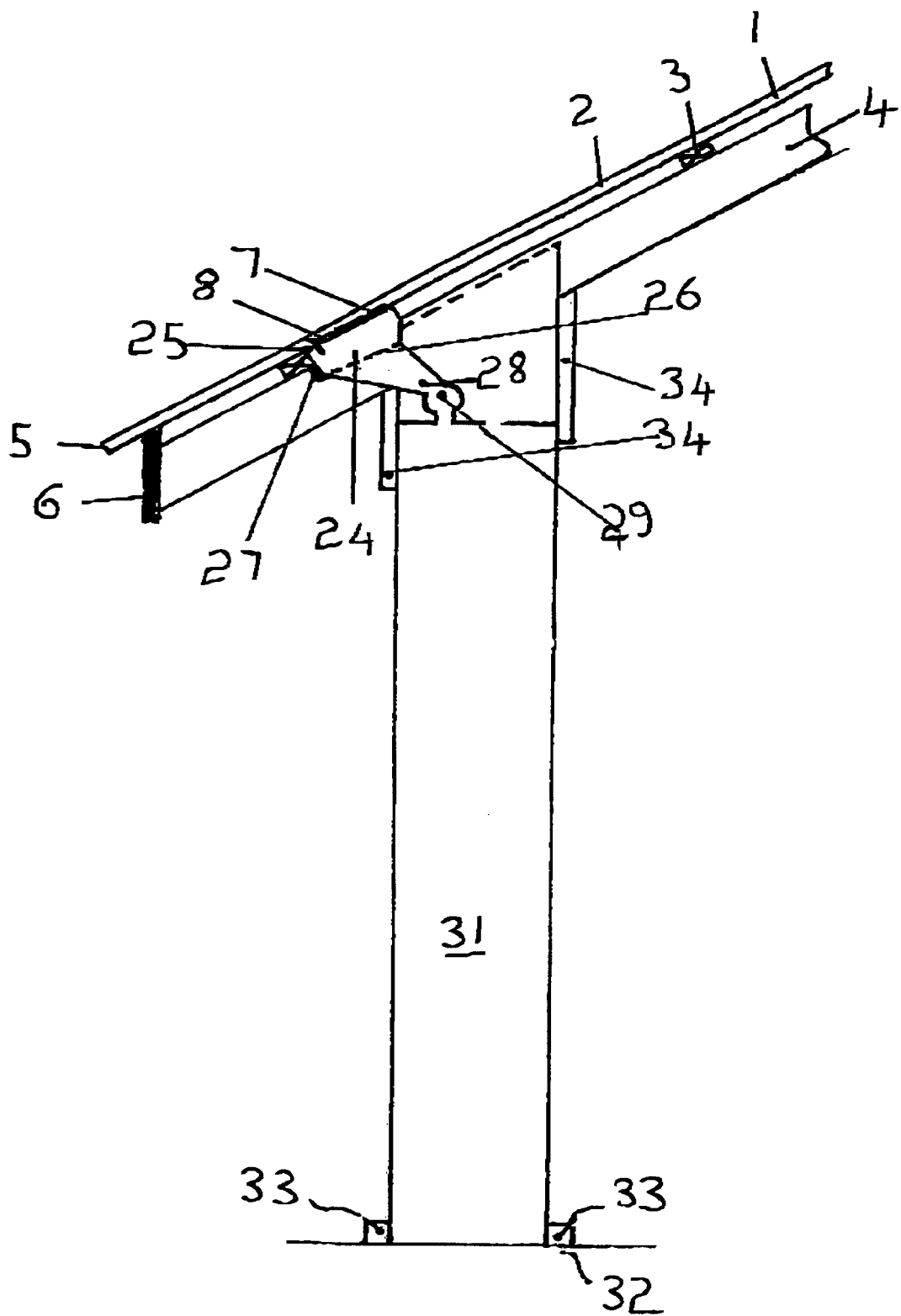
FIG. 2 is a side section view of an embodiment of the invention.

Referring initially to FIG. 2, there is shown a side section view of a rainwater collection and storage system. In FIG. 2, there is illustrated a roof 1 containing metal corrugated roofing sheets 2 which, in the conventional manner, are attached to roof battens 3, the roof battens being nailed or otherwise attached to roof rafters 4. In the embodiment, the lowermost edge 5 of roof 1 does not have a gutter and excess water merely flows over the edge. The front of the roof rafter has a fascia body 6 as is known.

Figure 1:
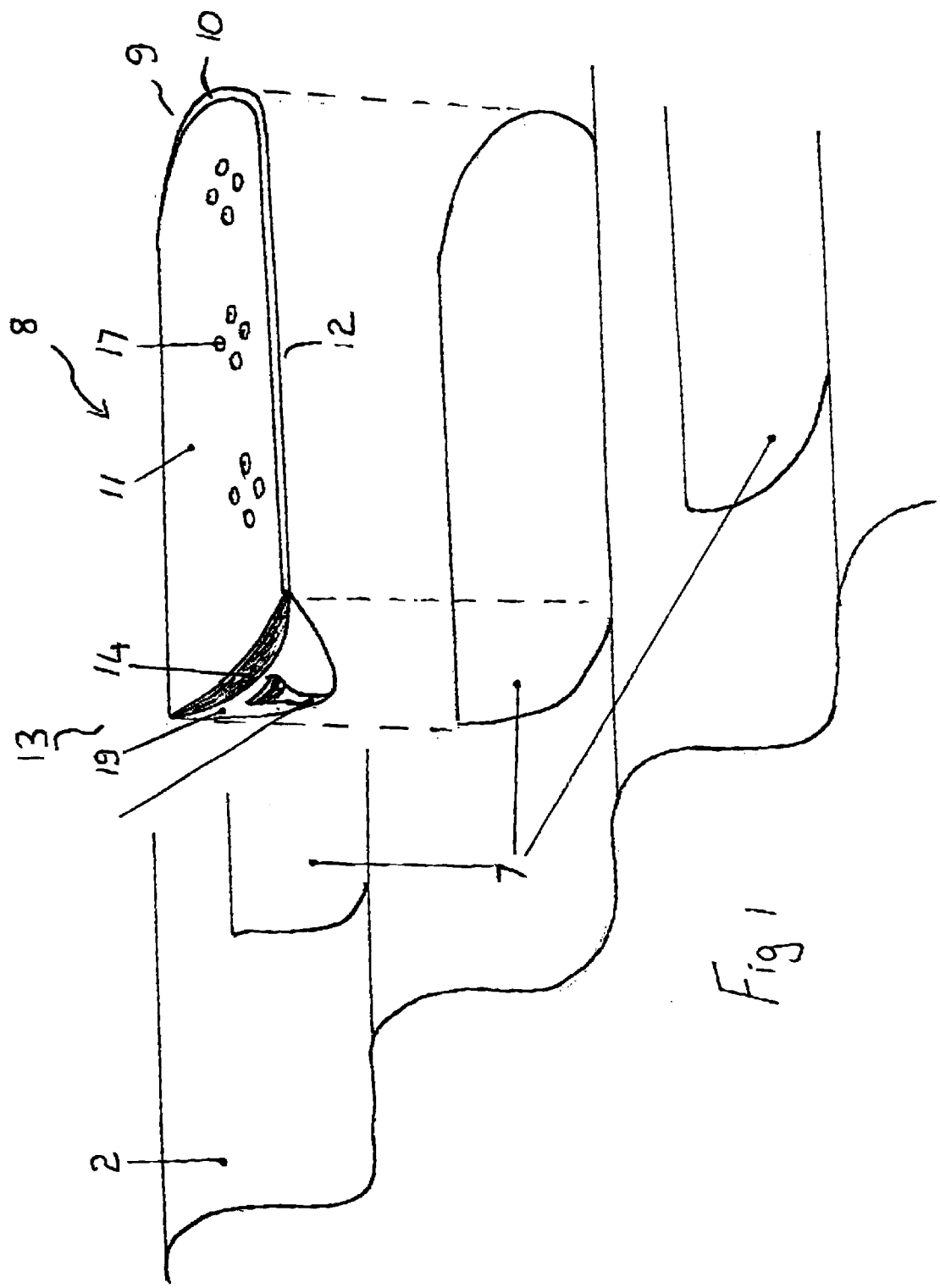
FIG. 1 is a perspective view of a roofing sheet showing an array of receiver slots and an insert member.

Spaced from edge 5 and punched through roofing sheets 2 is an array of receiver slots 7 which are better illustrated in FIG. 1. The receiver slots 7 extend across each of the suitable valleys in the corrugated roof sheets 2. These receiver slots 7 accept insert members 8 which are formed to match the particular roof profile.

The insert member 8 is more clearly illustrated in FIG. 1. The insert member 8 is curved to match the curvature of the valley of the corrugated roof sheet 2. The insert member 8 has a front or nose end 9 which in use is located at the upstream end of the normal flow of rainwater on the roof. The front or nose end 9 of the insert member 8 is rounded and contains a mouth-like slot 10 between the upper 11 and the lower surfaces 12. This slot receives an edge of the roof sheeting and positively locates the front or nose end 9 of the insert member 8. At the lower or tail end 13 of the insert member 8 on the upper surface is a small upstanding tab 14 which assists manual removal of the insert member and acts as a roofwater flow brake to assist roofwater capture into the insert member. The tab 14 is inclined at an obtuse angle to the upper surface of the insert member.

The lower surface 12 of the insert member is a close fit in the roof receiver slot 7 and the upper surface 11 is dimensioned to be slightly larger than the receiver slot, thus providing a watertight fit and a margin support function for the insert member 8. On the lower surface 12 at the lower, or tail, end, is a vertical deflector fin 19 which directs any roofwater running on the lower side 12 of the insert member down into a box chamber 24 (illustrated in FIG. 2). Part of this vertical deflector fin 19 also contains an integral lever clip 20 which positively locates the insert member 8 in the receiver slot 10 of the roof sheeting 2. This clip is compressed by thumb or finger pressure to enable the insert member to be unlocked, removed, and replaced, by another insert member having collection slots more suited to updated rainfall forecast trends.

The insert member 8 has a plurality of circular water collection slots 17. The size, shape and number of slots 17 in the insert member 8 can be varied to suit the particular rainfall zone.

Figure 3:
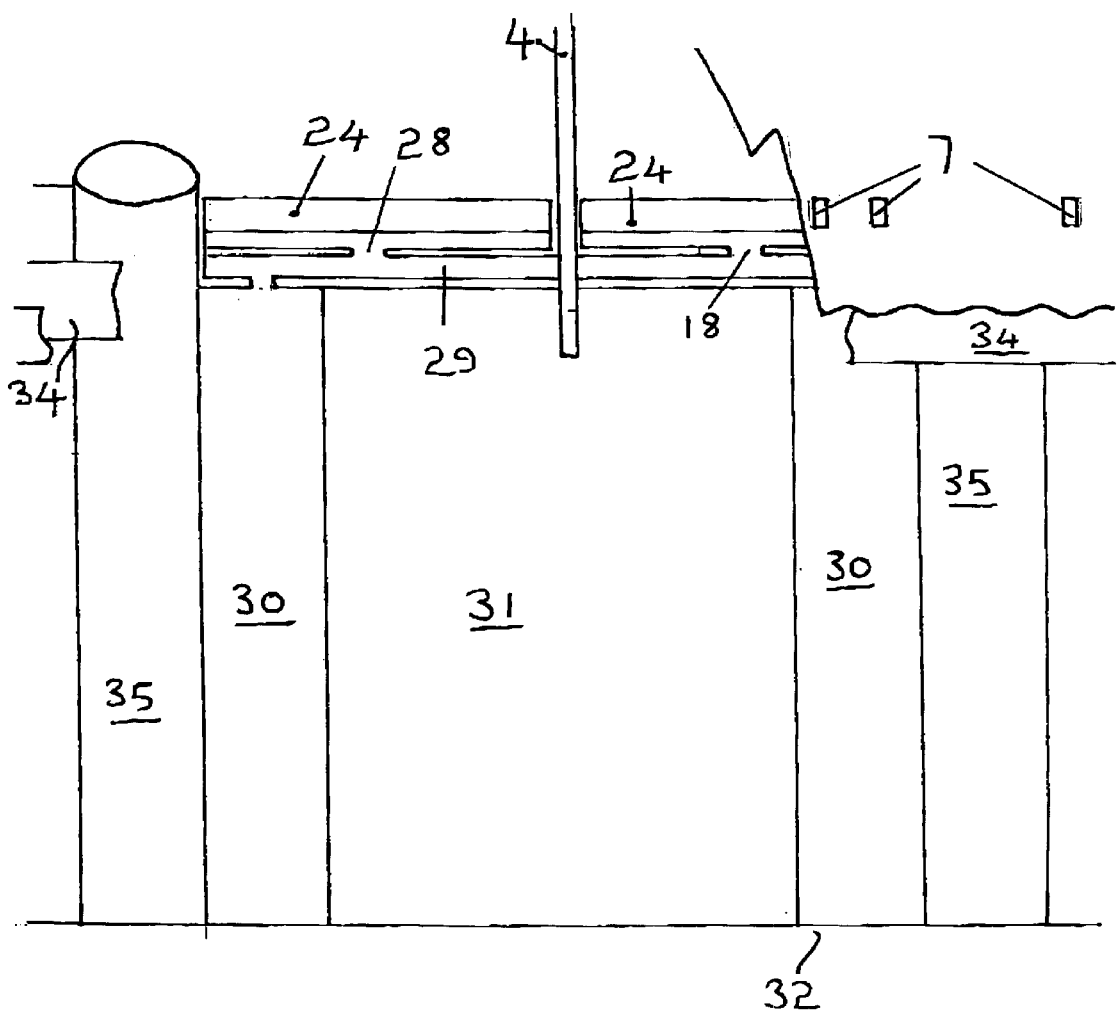
FIG. 3 is a front view of an embodiment of the invention.

Underneath the collector slots 17 is a box chamber 24 illustrated in FIGS. 2 and 3. The box chamber 24 can be formed of plastics or metal and has an upper wider body which is provided with a lower seal 25 (which could be a peripheral seal) which seals against the bottom of the roofing sheets to ensure that all the water passing through the slots passes into the box chambre. If the roofing sheets are corrugated, seal 25 is also corrugated to provide an effective seal.

An angled mesh panel or screen 26 is provided in box chamber 24 and below slots 17 in insert members 8. Screen 26 collects any debris that may pass through slots 17. Screen 26 slopes downwardly and a small opening or flap 27 is provided on a lower side of box chamber 24 and above screen 26. The flap 27 can be opened to clear any debris on screen 26. The flap may be of a free hinging type which will open when debris-containing water passes through slots 17 and joins with the water passing through screen 26. The debris is then pushed under the combined influences of water and gravity against flap 27, which can then hinge open to discharge the debris. Box chamber 24 has a narrower base portion 28 which comprises an inlet to a manifold 29. It can be seen that the manifold inlet 29 is offset from the inlet to the box chamber 24. In this way, light is prevented from entering the manifold. Avoiding light entry into the water storage area can minimize or avoid algal growth in the stored water.

The box chamber 24 is elongate and collects water from water extending through the slots in adjacent valleys on the corrugated roof sheeting. In FIG. 3, this is illustrated. In this figure, two box chambers 24 are illustrated each having a manifold inlet 28 with each box chamber collecting roof water between the roof rafters 4. This of course can vary to suit.

The box chambers 24 are connected to a series of manifolds 29 which deliver the roofwater to a first-flush unit 30. Each flush unit 30 is contained within a tank wall module 31. One of the first-flush units 30 is constructed inside each tank wall module 31 during manufacture. This arrangement collects the initial flow of possible dirt or mud-containing water and diverts or discharges it through a dump valve (not illustrated) at the base of tank wall module 31. After that, additional water passes into tank wall module 31. Tank wall module 31 is made from steel or plastic or other suitable material and in the embodiment is not load supporting. The tank wall module extends from the floor slab 32 to underneath the roof rafter 4. The height of the tank wall module will depend upon the distance between the floor slab 32 and the roof but is typically between 2 to 3 m. The length of the tank wall module can also vary and can be between 0.5 to 3 m depending on the spacing between the posts or columns which support the roof. The thickness of the tank wall module approximates the thickness of the column or post supporting the roof, and as this thickness is about 200 to 250 mm, the tank thickness is also between 200 to 250 mm, giving it a narrow section.

The tank wall is supported on the floor slab 32 via two rails 33.

Referring to FIG. 3, the tank wall module 31 is positioned between two vertical posts 35 and is located between the posts which support the roof structure. The tank wall module 31 is a free standing wall but in the embodiment, is a non-load bearing structure. For this reason, upper support beams 34 are provided to support the roof rafters. As the tank wall module 31 is non-load bearing the tank wall module may be removed relatively easily.

In a retrofit situation, the tank wall can be located outside and adjacent the existing timber or brick external wall.

The tank wall module can function as an efficient insulator against the extremes of heat and cold, can provide a water supply for fire fighting, garden use, pools, or other household uses, and can provide low cost water storage to reduce treated water consumption.

A number of tank wall modules 31 can be provided around the house. The water in the tanks can be pumped between tanks in operatively associated modules to transfer warm and cold water to desired areas for heating and cooling purposes. For instance, room mounted photo voltaic cell panels, a simple software package, small 24 v pumps with thermostatic sensors, interconnecting pipes and solenoid valves can be used to pump water between tanks.

Throughout this specification, the word "comprise" or variations thereof such as "comprises" or "comprising" will be understood to imply the inclusion of a stated element or integer or group of integers but not the exclusion of any other element or integer or group of elements or integers.

It should be appreciated that various other changes and modifications can be made to the embodiment described without departing from the spirit and scope of the invention.

What is claimed is:

1. A rainwater collection and storage system to collect and store roof water, the system comprising:

water collection slots adapted to extend through roof sheets and spaced from the edge of the roof, collection means located below the roof sheets to collect the water from at least some of the slots, and at least one tank wall to store the collected water, the at least one tank wall having a narrow section to approximate a wall thickness, and extending from a ground floor to adjacent the roof.

2. The system of claim 1, which includes at least one roof insert member mounted in a complementary receiver slot in the roof sheet and at least some of the collection slots are located in the at least one roof insert member.

3. The system of claim 2, wherein the at least one insert member is removably mounted in a respective receiver slot.

4. The system of claim 3, wherein each roof insert member has an upper surface upon which rain water can flow, a lower surface, first and second ends, the first end being located upstream of the second end relative to the direction of rain water flow across the roof, the first and second ends having discrete shapes such that the insert member can only be mounted in the receiving slot in one direction only.

5. The system of claim 4, wherein the first end of the insert member has a slot for receiving an edge of the roof sheet.

6. The system of claim 4, wherein the second end has an upstanding tab for obstructing the flow of water across the upper surface.

7. The system of claim 4, wherein the insert member has a tab depending from the second end for directing water running along the lower surface into the collector.

8. The system of claim 4, wherein the roof is corrugated, each roof insert member is located in a valley of the corrugation and the insert member is curved to conform to the curvature of the valley.

9. The system of claim 8, wherein the upper surface of the insert member has a lip which abuts the edge of the receive slot so as to form a water seal.

10. The system of claim 1, wherein the collector includes a collection chamber having an inlet and an outlet and a filter hingedly mounted within the chamber.

11. The system of claim 10, wherein the outlet is offset from the inlet.

12. The system of claim 11, wherein the outlet is connected to a manifold.

13. The system of claim 10, which includes a first flush tank which is filled before water flows to the tank wall and water in the flush tank is discharged to waste.

14. A climate management system for a building which comprises the system of claim 1, and a plurality of wall tanks spaced about the building and either forming part of the external walls, or in front of the external walls, the wall tanks being interconnected by pipe work, pump means to pump water between the tanks, and temperature sensing means to sense the water temperature in the tanks, whereby water is pumped between tanks to provide climate control to the building.

15. A building having the system of claim 1, and at least two wall tanks are located in, or adjacent to, external walls of the building.

16. A building having the climate management system of claim 14.

17. A roof insert member for use in the system of claim 1, the insert member having a first end, a second end, an upper surface upon which rain water can flow and a lower surface, the insert member having at least one water collection slot, an engaging slot at the first end for engaging an edge of a receiving slot in a roof sheet.

* * * * *